(12) United States Patent
Rathod et al.

(10) Patent No.: US 10,133,993 B2
(45) Date of Patent: Nov. 20, 2018

(54) EXPERT DATABASE GENERATION AND VERIFICATION USING MEMBER DATA

(71) Applicant: Microsoft Technology Licensing, LLC, Redmond, WA (US)

(72) Inventors: Mehul Kamlesh Rathod, Fremont, CA (US); Utkarsh Kishor Contractor, Fremont, CA (US); Wilmar DeJesus Bolivar, Sunnyvale, CA (US); Debasish Mishra, Santa Clara, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 90 days.

(21) Appl. No.: 14/957,486

(22) Filed: Dec. 2, 2015

(65) Prior Publication Data

US 2017/0060873 A1 Mar. 2, 2017

Related U.S. Application Data

(60) Provisional application No. 62/212,531, filed on Aug. 31, 2015.

(51) Int. Cl.
| | |
|---|---|
| *G06F 17/30* | (2006.01) |
| *G06Q 10/06* | (2012.01) |
| *G06Q 10/00* | (2012.01) |
| *G06Q 50/00* | (2012.01) |

(52) U.S. Cl.
CPC ............ *G06Q 10/06* (2013.01); *G06Q 10/00* (2013.01); *G06Q 50/01* (2013.01)

(58) Field of Classification Search
CPC .................................................. G06Q 10/06
See application file for complete search history.

(56) References Cited

U.S. PATENT DOCUMENTS

| | | | | |
|---|---|---|---|---|
| 6,829,585 B1* | 12/2004 | Grewal | ............... | G06Q 10/02 379/265.05 |
| 8,296,162 B1* | 10/2012 | Horn | ................ | G06Q 10/10 705/2 |
| 2003/0101083 A1* | 5/2003 | Venkatesh | ........... | G06Q 10/10 706/60 |
| 2006/0174250 A1* | 8/2006 | John | .................. | G06Q 10/10 719/313 |
| 2006/0184464 A1* | 8/2006 | Tseng | ............... | G06F 17/30616 706/14 |

(Continued)

*Primary Examiner* — Syed H Hasan
(74) *Attorney, Agent, or Firm* — Schwegman Lundberg & Woessner, P.A.

(57) ABSTRACT

Techniques for generating an expert database and verifying an expert using member data are described. A search request can be received from a device of the user. The search request can include a specific skill associated with the expert. Additionally, profile data can be accessed from a database in the online social network. Additionally, an expert recommendation process can determine an expert from the members of the online social network based on the search request and the profile data of the members. Moreover, social graph data can be accessed from a second database in the online social network. Furthermore, a connection path process can determine the connection path between the user and the expert based on the social graph data. Subsequently, the determined expert and the determined optimal path between the user and the expert can be presented on a display of the device.

19 Claims, 8 Drawing Sheets

(56) References Cited

U.S. PATENT DOCUMENTS

| | | | |
|---|---|---|---|
| 2010/0250605 A1* | 9/2010 | Pamu | G06F 17/30533 |
| | | | 707/783 |
| 2010/0268669 A1* | 10/2010 | Anthony-Hoppe | G06Q 10/10 |
| | | | 705/36 R |
| 2011/0055207 A1* | 3/2011 | Schorzman | G06F 17/30699 |
| | | | 707/723 |
| 2011/0061004 A1* | 3/2011 | Tripathi | G06F 17/30696 |
| | | | 715/753 |
| 2014/0164537 A1* | 6/2014 | Bank | H04L 51/04 |
| | | | 709/206 |
| 2015/0039357 A1* | 2/2015 | Segal | G06Q 10/06314 |
| | | | 705/5 |
| 2015/0310177 A1* | 10/2015 | Csurka | G06N 5/04 |
| | | | 706/50 |
| 2015/0379474 A1* | 12/2015 | Green | G06Q 10/1093 |
| | | | 705/7.18 |
| 2017/0169081 A1* | 6/2017 | Barak | G06F 17/30554 |
| 2017/0213191 A1* | 7/2017 | Pitcher | G06Q 10/1095 |

* cited by examiner

EXPERT DATABASE GENERATION AND VERIFICATION USING MEMBER DATA

PRIORITY APPLICATION

This application claims priority to U.S. Provisional Patent Application Ser. No. 62/212,531, filed Aug. 31, 2015, which is incorporated herein by reference in its entirety.

TECHNICAL FIELD

The subject matter disclosed herein generally relates to data processing for generating an expert database, and validating a subject matter expert in a specific skill based on member data in an online social network. Specifically, the present disclosure relates to techniques for presenting an expert to a user of the online social network, and calculating a connection path between the expert and the user.

BACKGROUND

An online social network can maintain information on members, companies, organizations, employees, and employers. The online social network may maintain profile pages of members, which can include education information, employment information, and location information about a specific member. Additionally, the online social network can store information about a member's relationships (e.g., connections) with other members of the online social network.

BRIEF DESCRIPTION OF THE DRAWINGS

Some embodiments are illustrated by way of example and not limitation in the figures of the accompanying drawings.

DETAILED DESCRIPTION

Figure 1:
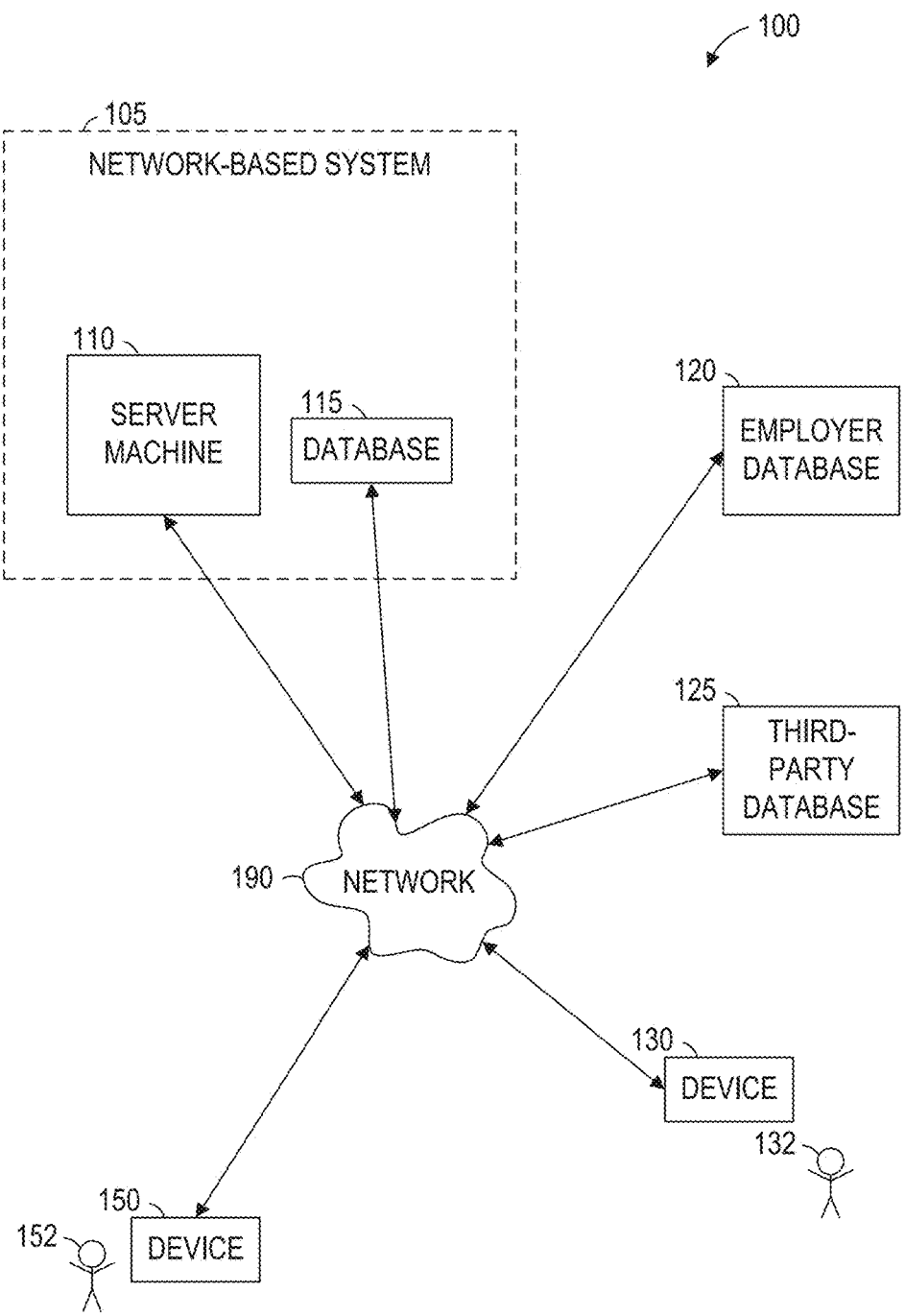
FIG. 1 is a network diagram illustrating a network environment suitable for an online social network, according to some example embodiments.

Example methods and systems are directed to techniques for determining a verified subject matter expert in an online social network. More specifically, the present disclosure relates to methods, systems, and computer program products for presenting a subject matter expert that is ideal for a user based on a connection path. Techniques for determining a subject matter expert and determining a connection path are described herein.

Examples merely demonstrate possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

In some instances, a user of the online social network may want to search for a subject matter expert with a specific skill. Often, some useful information to connect to the subject matter expert may be missing or otherwise unavailable to the user. Additionally, a member may simply list a specific skill on the member profile page without actually being a subject matter expert in the specific skill.

For example, the member profile page of a member can include a location, education information, employer information, and an industry associated with the member. Additionally, a member profile page can include a list of skills that the member possesses. Furthermore, other members in the online social network can endorse a skill of the member using an endorsement. Moreover, other members can recommend the member by posting a recommendation on the member profile page.

In some instances, a user of the online social network may want to search for a subject matter expert having a specific skill. In current implementations, the search results for a subject matter expert having a specific skill can be based on active directory (AD) indexing (e.g., based on keywords in the member profile page).

However, searching simply based on keyword can have many limitations. For example, a member profile page can include, without verification, a keyword associated with a specific skill in order to be ranked higher in a search for the specific skill. In contrast, techniques are described herein for finding a verified expert. By finding a verified expert, a user can obtain accurate information about members of the online social network, which can result in the user saving time and resources.

According to some embodiments, an indexing process and an expert recommendation process can use an expert-finding algorithm to rank experts based on information available in the member profile page. The member profile page can include years of experience in a particular job industry or job title. For example, a higher ranking in the expert search results can be given to a member with more experience. Additionally, the member profile page can include other information relevant to a specific skill, which can be used by the expert-finding algorithm. The other information relevant to a specific skill can include a previous job title, a position with a current employer, projects completed as an employee, published papers, patents, educational information (e.g., school rankings, major), portfolio, certifications, awards, and so on.

In some instances, the expert-finding algorithm can use internal information available to the employer of the member, such as information in an employer database. The internal information can include hiring information from an interview module, internal employee directory profiles, internal repositories, and so on. For example, when the member is the interviewer in an interview about a specific skill, then the member can be determined to be a subject matter expert in the specific skill. Alternatively, when the member is the interviewee and received positive feedback regarding the specific skill, then the member can be determined to be a subject matter expert in the specific skill.

Furthermore, the member profile page can include recommendations and endorsements of a specific skill. The specific skill can be verified based on the recommendations and endorsements. For example, the specific skill being endorsed by other members having the same job title as the member can be used to verify that the member is a subject matter expert in the specific skill.

Moreover, the expert-finding algorithm can use additional third-party data regarding the expertise of members in order to rank experts. The third-party data can be accessed from other online social networks, published articles, published projects, online tutorial websites, patents, group memberships, and so on.

In addition to ranking experts associated with a specific skill by the indexing process, an expert recommendation process can recommend an expert based on a search request from a member.

The indexing process and the expert recommendation process, using the expert-finding algorithm, can help identify a subject matter expert for a specific user based on the member profile data, the internal information available to the employer of the member, the third-party data, and social graph data of the member.

Additionally, a connection path process can determine the optimal connection path to the expert using the social graph data of the member. For example, the expert recommendation process and the connection path process can access social graph data to determine the optimal connection path to the expert. Social graph data of the user can include first-degree connections, second-degree connections, and so on. Furthermore, social graph data can include organizational data about the employer of the member. Organizational data of a member can include a manager of the member, a subordinate (e.g., an employee under the authority) of the member, and so on. Moreover, using social graph data in the online social network, the expert recommendation process can determine managers and subordinates connected to the expert. The manager of the expert can have the authority to delegate a work request to the expert based on a request from a manager of the member or the member. In some instances, the connection path process can determine the preferred connection path to the expert (e.g., by contacting the manager of the expert).

Techniques described herein allow for presentation of a recommended expert to a member in the online social network, the expert being associated with a specific skill. The recommendation can be based on the profile data, the internal data, the third-party data, and the social graph data of the member. For example, by using the information accessed from the member profile page, the expert recommendation process can recommend a verified expert to a member.

Additionally, a user input from a member of the social network can initiate (e.g., trigger) the process of automatically initiating a message between the member and the expert, or between the member and the manager of the expert. In some instances, the message can be sent from the member to the manager of the expert.

FIG. 1 is a network diagram illustrating a network environment 100 suitable for an online social network service, according to some example embodiments. The network environment 100 includes a server machine 110, a database 115, an employer database 120, a third-party database 125, a first device 130 for a first user 132, and a second device 150 for a second user 152, all communicatively coupled to each other via a network 190. The server machine 110 and the database 115 may form all or part of a network-based system 105 (e.g., a cloud-based server system configured to provide one or more services to the devices 130 and 150). The database 115 can store, but is not limited to storing, member data, company data, education data, social graph data, and member activity data for the online social network service. In some instances, the database 115 can include a plurality of databases (e.g., a first database to store profile data, a second database to store social data, a third database to store member activity data). The server machine 110, the first device 130, and the second device 150 may each be implemented in a computer system, in whole or in part, as described below with respect to FIG. 8.

The employer database 120 can store internal information available to the employer of a member. The internal information can include hiring information from an interview module, internal employee directory profiles, internal repositories, and so on. The server machine 110 can access the information in the employer database 120 using the network 190.

The third-party database 125 can store third-party data regarding the expertise of a member. The third-party data can be accessed from other online social networks, published articles, published projects, online tutorial websites, patents, group memberships, and so on. The server machine 110 can access the information in the third-party database 125 using the network 190.

Also shown in FIG. 1 are the users 132 and 152. One or both of the users 132 and 152 may be a human user (e.g., member of the online social network), a machine user (e.g., a computer configured by a software program to interact with the device 130 or 150), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, a smartphone, or a wearable device (e.g., a smart watch or smart glasses) belonging to the user 132. Likewise, the user 152 is not part of the network environment 100, but is associated with the device 150. As an example, the device 150 may be a desktop computer, a vehicle computer, a tablet computer, a navigational device, a portable media device, a smartphone, or a wearable device (e.g., a smart watch or smart glasses) belonging to the user 152.

In some instances, the user 132 can be the member searching for a subject matter expert, or the manager of the member. Additionally, the user 152 can be the subject matter expert or the manager of the subject matter expert. For example, the server machine 110 can transmit a message to the user 152 (e.g., subject matter expert) on behalf of the user 132 (e.g., inquirer) using the network 190.

The network 190 may be any network that enables communication between or among machines, databases, and devices (e.g., the server machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., a Wi-Fi network or WiMAX network), or any suitable combination thereof. Any one or more portions of the network 190 may communicate information via a transmission medium. As used herein, "transmission medium" refers to any intangible (e.g., transitory) medium that is capable of communicating (e.g., transmitting) instructions for execution by a machine (e.g., by one or more processors of such a machine), and includes digital or analog communication signals or other intangible media to facilitate communication of such software.

Any of the machines, databases, or devices described herein may be implemented in a general-purpose computer modified (e.g., configured or programmed) by software (e.g., one or more software modules) to be a special-purpose computer to perform one or more of the functions described herein for that machine, database, or device. For example, a computer system able to implement any one or more of the methodologies described herein is discussed below with respect to FIG. 8. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices described herein may be combined into a single machine, database, or device, and the functions described herein for any single machine, database, or device may be subdivided among multiple machines, databases, or devices.

Figure 2:
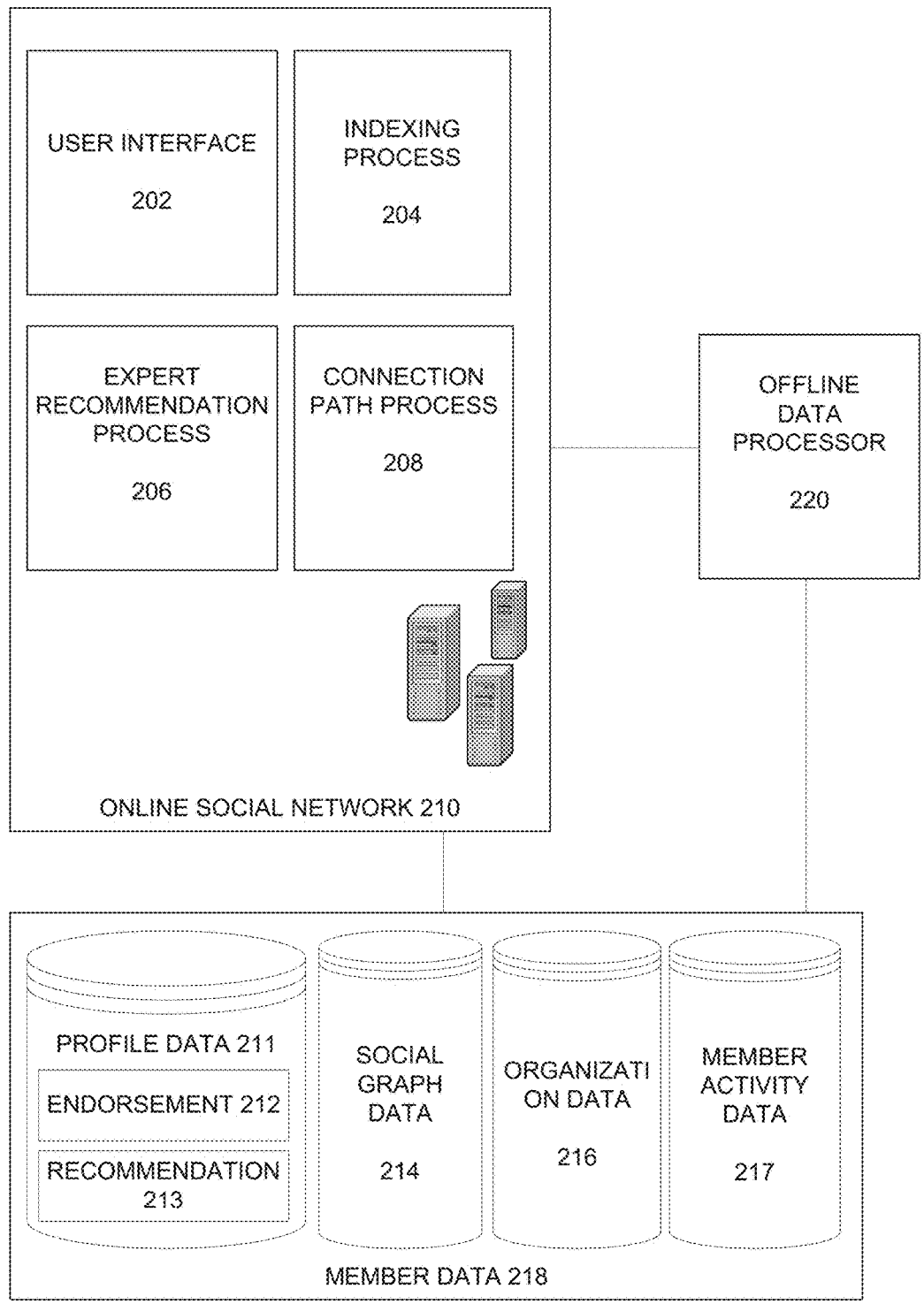
FIG. 2 is a block diagram illustrating various components of an online social network, according to some example embodiments.

FIG. 2 is a block diagram illustrating components of an online social network 210, according to some example embodiments. The online social network 210 is an example of a network-based system 105 of FIG. 1. The online social network 210 can include a user interface 202, an indexing process 204, an expert recommendation process 206, and a connection path process 208, all configured to communicate with each other (e.g., via a bus, shared memory, or a switch). The user interface 202 can provide information or cause an interface to be rendered on a client device of the member.

Additionally, the online social network 210 can communicate with the database 115 of FIG. 1, such as a database storing member data 218. Furthermore, the online social network 210 can communicate with the employer database 120 and the third-party database 125 of FIG. 1.

The member data 218 can include profile data 211, which includes an endorsement 212 and a recommendation 213 associated with the member. Moreover, the member data 218 can include social graph data 214, organization data 216, and member activity data 217. Using the member data 218, a recommendation for a subject matter expert can be determined based on a search request. In some instances, some of the processing of the data for determining an expert can be performed by an offline data processor 220 on a periodic basis (e.g., nightly) in order to return faster search results.

As previously mentioned, the member data 218 includes the profile data 211, including the endorsement 212 of a skill and the recommendation 213 of the member by another member in the online social network 210. Additionally, the member data 218 can store the social graph data 214, the organization data 216, and the member activity data 217. The social graph data 214 of a member can include first-degree connections, second-degree connections, and so on.

The profile data 211 can be used to determine a member that is a subject matter expert in a specific skill. For instance, with many online social network services, when a user registers to become a member, the member is prompted to provide a variety of personal and employment information that may be displayed in a member's profile page. Such information is commonly referred to as profile data 211. The profile data 211 that is commonly requested and displayed as part of a member's profile includes the member's age, birthdate, gender, interests, contact information, residential address, home town and/or state, spouse's and/or family members' names, educational background (e.g., schools, majors, matriculation and/or graduation dates, etc.), employment history, office location, skills, professional organizations, and so on. In some embodiments, the profile data 211 may include the various skills that each member has indicated he or she possesses. Additionally, the profile data 211 may include skills of a member that have been endorsed by another member.

With certain online social network services, such as professional network services, the profile data 211 can include information commonly included in a professional resume or curriculum vitae, such as information about a person's education, the company at which a person is employed, the location of the employer, an industry in which a person is employed, a job title or function, an employment history, skills possessed by a person, professional organizations of which a person is a member, and so on.

For example, the profile data 211 may include the various skills that each member has indicated he or she possesses. Additionally, the profile data 211 may include an endorsement 212. The endorsement 212 can be a skill for which a member has been endorsed in the profile data 211. In some instances, the indexing process 204 can rank subject matter experts using the endorsement 212. Additionally, a recommendation 213 of a member can be received from another member. The recommendation 213 can include a keyword associated with the specific skill. The indexing process 204 can rank subject matter experts based on the recommendation 213.

Additionally, online social network services provide their users with a mechanism for defining their relationships with other people. This digital representation of real-world relationships is frequently referred to as a social graph, which may be stored in the social graph data 214.

The optimal connection path process 208 can use the organization data 216 and the social graph data 214 to determine the optimal path for an inquirer (e.g., a member sending a search request) to reach the expert.

In some instances, the social graph data 214 can be based on an entity's presence within the online social network service. For example, consistent with some embodiments, a social graph is implemented with a specialized graph data structure in which various entities (e.g., people, companies, schools, government institutions, non-profits, and other organizations) are represented as nodes connected by edges, where the edges have different types representing the various associations and/or relationships between the different entities. The optimal connection path process 208, using the social graph data 214, can determine a member to contact in order to reach the expert. For example, the optimal connection path process 208 can direct the user to reach out to the manager of the expert in order to request support from the expert.

Furthermore, the social graph data 214 may be maintained by a third-party social network service. For example, users can indicate a relationship or association with a variety of real-world entities and/or objects. Typically, a user input is captured when a user interacts with a particular graphical user interface element, such as a button, which is generally presented in connection with the particular entity or object and frequently labelled in some meaningful way (e.g., "like," "+1," "follow").

Referring back to FIG. 2, in addition to hosting a vast amount of social graph data 214, many online social network services maintain organization data 216 and member activity data 217.

The organization data 216 can include a company organization chart. The company organization chart can be determined by the online social network 210 using member data 218 of employees of the company. For example, the organization data 216 can include a manager of the member, a subordinate (e.g., an employee under the authority) of the member, and so on.

The online social network 210 may provide a broad range of other applications and services that allow members the opportunity to share and receive information, often customized to the interests of the members. In some embodiments, members may be able to self-organize into groups, or interest groups, organized around subject matter or a topic of interest. In some embodiments, the online social network 210 may host various job listings providing details of job openings with various organizations.

The member activity data 217 can include members' interaction with the various applications, services, and content made available via the online social network 210, and the members' behavior (e.g., content viewed, links selected, etc.) may be used to determine an expert.

Furthermore, the online social network 210 can be configured to process data offline or periodically using the offline data processor 220. In some instances, some or all of the indexing process 204 can be performed by the offline data processor 220. For example, the offline data processor 220 can include Hadoop servers that access the member data 218 periodically (e.g., on a nightly basis) to rank members according to a specific skill.

Processing the member data 218, such as ranking members according to a specific skill, may be computationally intensive; therefore, due to hardware limitations and to ensure reliable performance of the online social network 210, some determination or calculation by the indexing process 204, the expert recommendation process 206, and the optimal connection path process 208 may be done offline. For example, the member data 218 may be processed (e.g., real-time, background/offline) using the indexing process 204 to determine subject matter experts for specific skills.

In some instances, the online social network 210 can standardize the specific skills. The expert recommendation process 206 can present more accurate information for a search request using standardized skills.

Additionally, the expert recommendation process 206 can present, to a user 132, an expert from the determined subject matter experts based on the member data 218 of the user 132. Additionally, the connection path process 208 can determine the preferred way for the user 132 to connect to the presented expert. The connection path process 208 can select a path for the user to connect to the presented expert by considering factors such as a calculated ranking value.

Figure 3:
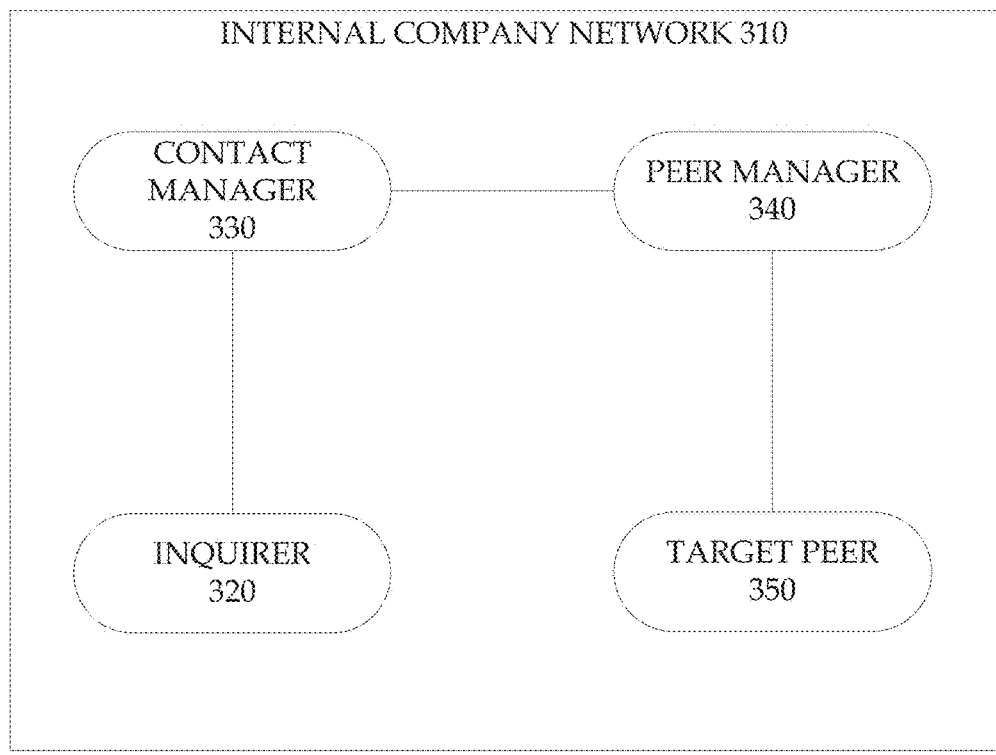
FIG. 3 is a block diagram illustrating the interactivity between different members in an internal company network of the online social network, according to some example embodiments.
Figure 4:
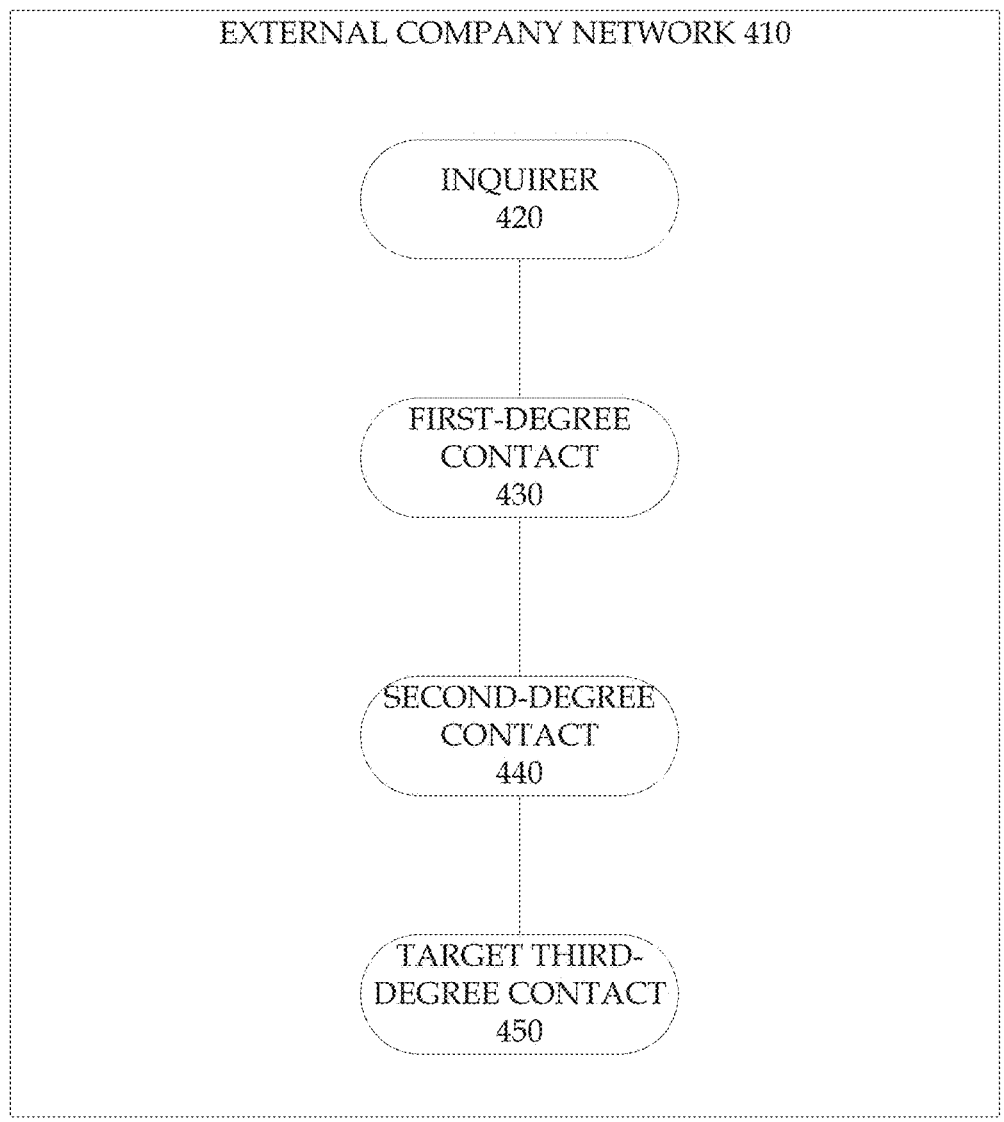
FIG. 4 is a block diagram illustrating the interactivity between different members in an external company network of the online social network, according to some example embodiments.
Figure 5:
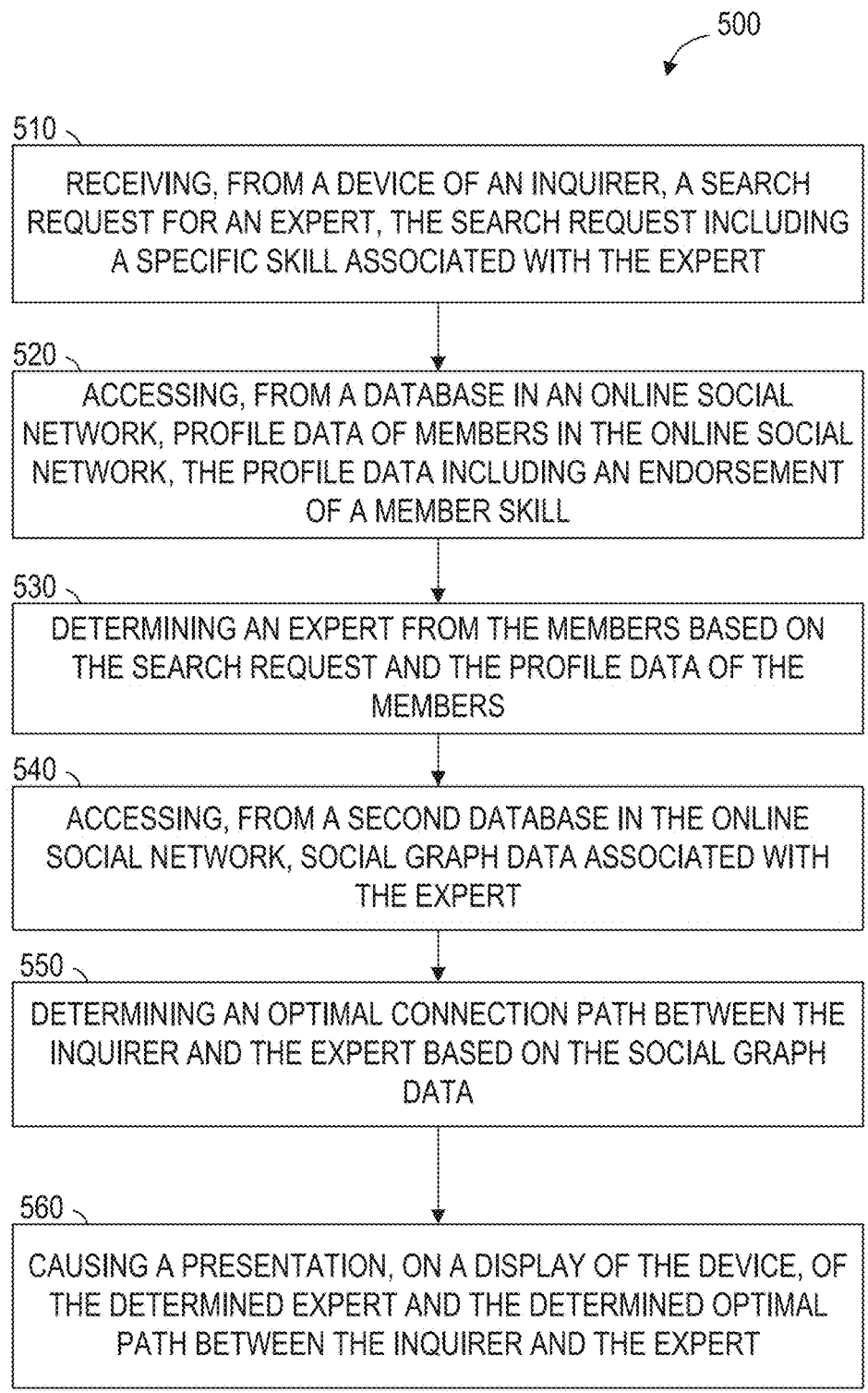
FIG. 5 is a flowchart illustrating a method for determining and connecting to an expert based on member data, according to some example embodiments.

As will be further described with respect to FIGS. 3-5, the expert recommendation process 206, in conjunction with the user interface 202, the indexing process 204, and the optimal connection path process 208, can present a verified expert to the user 132.

FIG. 3 is a block diagram illustrating the interactivity between different members in an internal company network 310 of the online social network 210, according to some example embodiments. For example, members that are employees of the same company can be part of the internal company network 310.

In some instances, an inquirer 320 can submit a search request to the online social network 210 for a co-worker having a specific skill. The co-worker can be another member of the online social network 210 that also works in the same company as the inquirer 320. The expert recommendation process 206 can present a target peer 350 based on the received search request. For example, the target peer 350 can have the skill requested in the search request. Additionally, the skill of the target peer 350 can be verified based on the member data 218 of the target peer 350, as described with respect to FIG. 5.

Furthermore, the optimal connection path process 208 can determine the optimal connection path for the inquirer 320 to contact the target peer 350. In some instances, the optimal connection path process 208 can determine a peer manager 340. The peer manager 340 can be the manager of the target peer 350. For example, the peer manager 340 can have the authority to delegate work to the target peer 350.

Moreover, the optimal connection path process 208 can determine a contact manager 330 associated with the inquirer 320. For example, the inquirer 320 may have a plurality of managers. The optimal connection path process 208 can determine the contact manager 330 from the plurality of managers. The determination of the contact manager 330 can be based on the member activity data 217 of the inquirer 320.

In some instances, based on the member activity data 217 of the inquirer 320, the optimal connection path process 208 can determine that the inquirer 320 contacts the contact manager 330 more frequently than other managers in the plurality of managers. Additionally, the degree of connections from a manager in the plurality of managers to the peer manager 340 can help determine the contact manager 330.

Additionally, the optimal connection path process 208 can help the inquirer 320 find the peer manager 340 that can delegate work to the target peer 350. For example, the optimal connection path process 208 can determine the contact manager 330 to reach out to the peer manager 340 to request the work to be delegated to the target peer 350.

As illustrated in FIG. 3, the inquirer 320 can be looking for a target peer 350. The target peer 350 can be an expert in the inquirer's 320 local organization. For example, the inquirer 320 can be looking for a network expert, a human resources expert, or a specific technology expert. Additionally, the inquirer 320 can search for a network expert having a specific experience, such as having worked in an intranet project. Continuing with this example, the inquirer 320 can submit a search request for a target peer 350 having a skill K1.

Subsequently, based on a search request with the keyword K1, the expert recommendation process 206 can search through the entire eligible expert collection. Additionally, the indexing processing 204 can rank experts based on sub-skills (e.g., experience), and the expert recommendation process 206 can recommend an expert based on a sub-skill. For example, the search request can be for an expert having network engineering skills, and the sub-skill can be having experience in the intranet project. The expert recommendation process 206 can return an expert in networking engineering who also has experience in the intranet project.

As previously mentioned, the indexing process 204 can generate and rank experts for a specific skill and a specific sub-skill (e.g., experience) using the offline data processor 220. The expert recommendation process 206 can determine one or more experts (e.g., target peers 350) based on the profile data 211 of the inquirer 320 or the target peer 350.

Moreover, the optimal connection path process 208 can determine a degree of connection between the inquirer 320 and the target peer 350. Additionally, the optimal connection path process 208 can present the inquirer 320 with a path to connect to the target peer 350. In this example, the optimal connection path process 208 can recommend to contact the contact manager 330, and request the contact manager 330 to contact the peer manager 340. The peer manager 340 can have the authority to delegate work to the target peer 350. The contact manager 330 and the peer manager 340 can have similar positions in the company's organizational chart.

According to some embodiments, once one or more target peers 350 have been identified, the expert recommendation process 206 can further rank the one or more target peers 350 using information derived from the target peers 350. Information derived from the target peer 350 can include, but is not limited to, a degree of connection from the inquirer 320, the geographic location of the target peer 350, the availability of the target peer 350, and so on. The availability of the target peer 350 can be based on the target peer's 350 participation in a group in the online social network 210, the target peer's 350 membership in the group, the target peer 350 being mentioned in third-party applications, or the target peer 350 indicating availability (e.g., listing "open for business" in the interest section of the online social network 210).

According to some embodiments, the techniques described with respect to FIG. 3 can be modified in order to apply to an external company network as illustrated in FIG. 4.

FIG. 4 is a block diagram illustrating the interactivity between different members in an external company network 410 of the online social network 210, according to some example embodiments. An external company network 410 of an inquirer 420 can be a professional network that is outside the current employer of the inquirer 420.

As illustrated in FIG. 4, the inquirer 420 can submit a search request for an expert having keyword K1. Additionally, the search request can be tailored for experts specifically in the external company network 410. In FIG. 3, the expert recommendation process 206 identified an expert within the inquirer's 320 company network. Alternatively, in FIG. 4, the expert recommendation process 206 can search through the entire eligible expert collection in the external company network 410 of the inquirer 420.

As previously mentioned, the indexing process 204 can, using the offline data processor 220, rank experts associated with keyword K1 based on the profile data 211 of each expert. Given the search for an expert in the external company network 410 of the inquirer 420, the expert recommendation process 206 determines the expert based on the search request, the profile data 211, and the other member data 218 (e.g., social graph data 214).

In this example, the expert can be a target third-degree contact 450. Once the expert has been determined, the optimal connection path process 208 can determine a first-degree contact 430 that is connected to the inquirer 420 in the online social network 210. Additionally, the optimal connection path process 208 can determine a second-degree contact 440. The second-degree contact 440 is connected to the first-degree contact 430 and the target third-degree contact 450 in the online social network 210. In some other instances, the expert in the external company network 410 can be a first-degree connection or a second-degree connection of the inquirer 420.

FIGS. 3 and 4 describe techniques for connecting an inquirer to an expert using the optimal connection path process 208, according to some embodiments. FIG. 5 describes techniques for determining the expert based on the search request from the inquirer, according to some embodiments.

FIG. 5 is a flowchart illustrating operations of the online social network 210 in performing a method 500 for determining and connecting to an expert based on a search request from an inquirer, according to some example embodiments. The inquirer can be the inquirer 320 of FIG. 3 or the inquirer 420 of FIG. 4. Additionally, the expert can be the target peer 350 of FIG. 3, the target third-degree contact 450 of FIG. 4. In some instances, the expert can be the first-degree contact 430 or the second-degree contact 440 of FIG. 4. Operations in the method 500 may be performed by the network-based system 105, using the indexing process 204, the expert recommendation process 206, and the optimal connection path process 208 described above with respect to FIG. 2. As shown in FIG. 5, the method 500 includes operations 510, 520, 530, 540, 550, and 560.

At operation 510, the expert recommendation process 206 can receive, from a device of an inquirer, a search request for an expert. The search request can include a specific skill associated with the expert. In some instances, the search request can include a sub-skill, such as a particular experience. For example, as discussed with respect to FIGS. 3-4, the specific skill can be based on a keyword (e.g., keyword K1), such as network engineering. Additionally, the sub-skill can include having experience in an intranet project.

At operation 520, the expert recommendation process 206 can access, from a database in an online social network (e.g., online social network 210), profile data 211 of members in the online social network. The database can be the database 115.

The profile data 211 accessed at operation 520 can include an endorsement 212 of a member skill, a recommendation 213 of the member, and the member's years of experience, location, job title, position in current company, projects completed with the company, current projects, published papers, patents, school, education information, portfolio, certifications, awards, and so on. As previously mentioned, the endorsement 212 or the recommendation 213 can be received from another member of the online social network 210. The other member can have a first-degree connection with the member.

Additionally, the endorsement 212 and recommendation 213 can be posted on the profile page of the member. Moreover, the endorsement 212 and recommendation 213 can be viewable by other first-degree connections of the member, or by the public. In some instances, when the endorsement 212 or recommendation 213 is private information (e.g., not available to the public or the inquirer), then the expert recommendation process 206 determines an expert without the private information. For example, the endorsement 212 of an expert may be available only to the expert's first-degree connections, and the inquirer may not be a first-degree connection; in this case, the expert recommendation process 206 does not include this private information when determining a subject matter expert for the inquirer.

Additionally, the expert recommendation process 206 can access internal data from the employer database 120, and third-party data from the third-party database 125. For example, the third-party data and the internal data regarding the expertise of a member can be accessed from other online social networks, internal employee directory profiles, published articles, published projects, internal repositories, online tutorial websites, publications, patents, or technical groups.

At operation 530, the expert recommendation process 206 determines an expert from the members based on the search request and the profile data of the members. For example, the expert can determined by calculating a ranking value for each member. The ranking value can be calculated based on the number of endorsement(s) 212 or recommendation(s) 213 of the specific skill in the profile data 211 of each member. In some instances, the expert can be determined based on accessed third-party data, or accessed internal data. A processor in the server machine 110 can perform the determination in real-time. In some instances, part of the determination at operation 530 can be performed offline using the offline data processor 220.

In some instances, the expert recommendation process 206 can verify the level of knowledge of an expert. By using the profile data 211, the internal data, or the third-party data, the expert recommendation process 206 can validate and verify skills listed on the member profile page. For example, the expert recommendation process 206 can verify an expert based on the endorsement 212 or the recommendation 213 associated with the member.

Additionally, the internal data can include a peer-evaluation or manager-evaluation about the member's skill set. For example, the manager-evaluation can be obtained from a record of an interview of the member by a manager.

Furthermore, the third-party data can include publications associated with the specific skill, the publications being authored by the member. The third-party data can include other information generated by the member, such as published articles, published projects, patents, and online tutorials.

At operation 540, the optimal connection path process 208 can access, from a second database in the online social network 210, social graph data associated with the expert. The second database can be the social graph data 214. In some instances, the optimal connection path process 208 can access the internal data from the employer database 120. The internal data can include an organization chart that includes the manager of the expert.

For example, the social graph data 214 or internal data can include organizational data about the employer of a member. Organizational data of a member can include a manager of the member, a subordinate (e.g., an employee under the authority) of the member, and so on. By using the social graph data 214 or internal data, the optimal connection path process 208 can determine managers and subordinates connected to the expert. The manager of the expert can have the authority to delegate a work request to the expert based on a request from a manager of the inquirer or the inquirer.

At operation 550, the optimal connection path process 208 can determine a connection path between the inquirer and the expert based on the social graph data 214. A processor in the server machine 110 can perform the determination in real-time. In some instances, part of the determination at operation 550 can be performed offline using the offline data processor 220.

At operation 560, the user interface 202 can cause a presentation, on a display of the device, of the determined expert and the determined optimal path between the inquirer and the expert. The presentation can include the name of the expert, information obtained from the profile page of the expert, and the first-degree connection of the inquirer to make the introduction. Additionally, the presentation can include the contact information of the manager of the expert.

In some instances, the presentation can include years of experience and a proficiency score of the expert. The proficiency score can be calculated by the expert recommendation process 206 based on the member data 218, the internal data, or the third-party data. For example, the proficiency score can range from 0-100. A higher score can be associated with an expert that is more proficient in the skill than another expert having a lower score. The proficiency score can be calculated based on the number of endorsements 212 or recommendation 213. The proficiency score can be adjusted based on the job title of the endorser or recommender. For example, the proficiency score can increase for an expert (e.g., software developer), when other members with the same job title (e.g., other software developer) recommend or endorse the expert.

Figure 6:
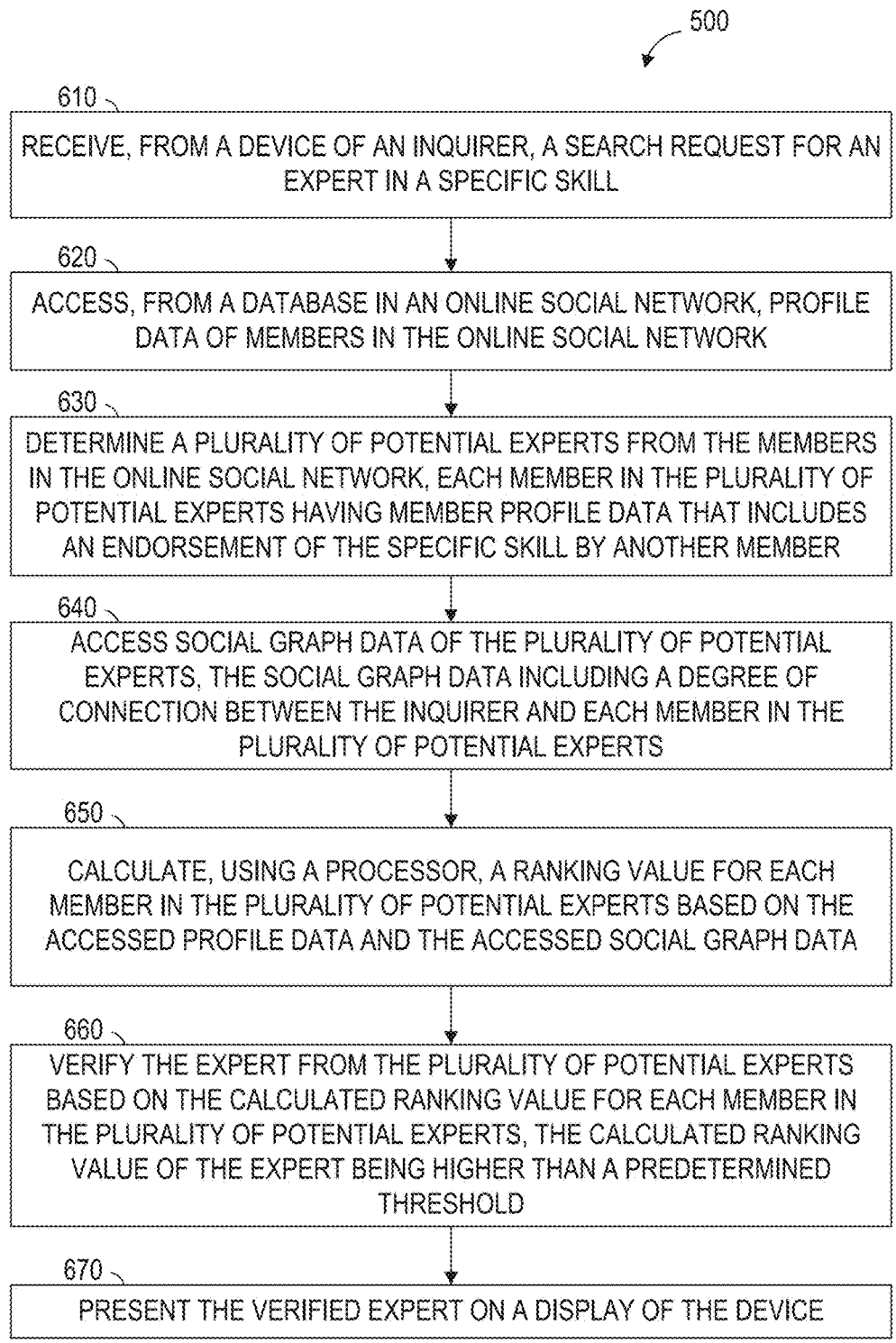
FIG. 6 is a flowchart illustrating another method for determining and connecting to an expert based on member data, according to some example embodiments.

FIG. 6 is a flowchart illustrating operations of the online social network 210 in performing another method 600 for determining and connecting to an expert based on a search request from an inquirer, according to some example embodiments. The inquirer can be the inquirer 320 of FIG. 3 or the inquirer 420 of FIG. 4. Additionally, the expert can be the target peer 350 of FIG. 3 or the target third-degree contact 450 of FIG. 4. Operations in the method 600 may be performed by the network-based system 105, using the indexing process 204, the expert recommendation process 206, and the optimal connection path process 208 described above with respect to FIG. 2. As shown in FIG. 6, the method 600 includes operations 610, 620, 630, 640, 650, 660, and 670.

At operation 610, the expert recommendation process 206 can receive, from a device of an inquirer, a search request for an expert in a specific skill. In some instances, the search request can include a sub-skill, such as a particular experience.

At operation 620, the expert recommendation process 206 can access, from a database in the online social network 210, profile data 211 of members in the online social network 210. The database can be database 115, and can be accessed using the network 190. As previously mentioned, the accessed profile data 211 can include an endorsement 212 of a member skill, a recommendation 213 of the member, and the member's years of experience, location, job title, position in current company, projects completed with the company, current projects, published papers, patents, school, education information, portfolio, certifications, awards, and so on.

Additionally, the expert recommendation process 206 can access internal data from the employer database 120, and third-party data from the third-party database 125 at operation 620.

At operation 630, the expert recommendation process 206 can determine a plurality of potential experts from the members in the online social network 210. A member is part of the plurality of potential experts when the member profile data of that member includes an endorsement of the specific skill by another member. In some instances, a potential expert can be determined based on the third-party data, or the internal data accessed at operation 620. A processor in the server machine 110 can perform the determination in real-time. In some instances, part of the determination at operation 630 can be performed offline using the offline data processor 220.

At operation 640, the optimal connection path process 208 can access social graph data 214 of the plurality of potential experts. The social graph data 214 can include a degree of connection (e.g., first-degree connection, second-degree connection) between the inquirer and each member in the plurality of potential experts. In some instances, the optimal connection path process 208 can access the internal data from the employer database 120. The internal data can include an organization chart that includes the managers of the potential experts.

At operation 650, the expert recommendation process 206 can calculate, using a processor, a ranking value for each member in the plurality of potential experts based on the accessed profile data and the accessed social graph data. A processor in the server machine 110 can perform the determination in real-time. In some instances, part of the determination at operation 650 can be performed offline using the offline data processor 220. In some instances, the ranking value can be a proficiency score, as later described with respect to FIG. 7.

In some instances, when the search request includes a sub-skill, the method 600 can further include determining a subset of experts from the plurality of potential experts. For example, the sub-skill can be a previously completed project, a certification, a portfolio, a past experience, and so on. A member is included in the subset of experts when the member profile data of that member includes the sub-skill. Additionally, the expert recommendation process 206 can increase the calculated ranking value for each member of the subset of experts.

At operation 660, the expert recommendation process 206 can verify an expert from the plurality of potential experts based on the calculated ranking value for each member in the plurality of potential experts. The calculated ranking value of the expert can be higher than a predetermined threshold. The predetermined threshold can be set by an administrator of the online social network 210, or determined dynamically based on the search results. In some instances, the expert is the member with the highest ranking value. A processor in the server machine 110 can perform the verification in real-time. In some instances, part of the determination at operation 660 can be performed offline using the offline data processor 220.

In some instances, the ranking value is calculated using the profile data 211, the internal data, or the third-party data of the member. For example, the internal data can include a peer-evaluation or manager-evaluation about the member's skill set. The third-party data can include publications associated with the specific skill, the publications being authored by the member. The third-party data can include other information generated by the member, such as published articles, published projects, patents, and online tutorials.

In some instances, the member profile data can include a recommendation, and the verifying of the expert at operation 660 can be based on the expert having a recommendation associated with the specific skill.

In some instances, the member profile data can include a location for each member in the plurality of potential experts, and the verifying of the expert at operation 660 can be based on a distance from the inquirer to the location of the expert being below a predetermined threshold.

In some instances, the member profile data can include an availability indicator for each member in the plurality of potential experts, and the verifying of the expert at operation 660 can be based on the availability indicator for the expert indicating that the expert is available.

In some instances, the profile data 211 can include a degree of connection between the inquirer and each member in the plurality of potential experts, and the verifying of the expert at operation 660 can be based on the degree of connection between the expert and the inquirer being below a predetermined threshold.

In some instances, the member profile data can include years of experience, and the verifying of the expert at operation 660 can be based on the years of experience of the expert being above a predetermined threshold.

In some instances, the member profile data can include a certification, and the verifying of the expert at operation 660 can be based on the expert having the certification.

At operation 670, the user interface 202 can present the verified expert on a display of the device of the inquirer. The presentation can include the name of the expert, information obtained from the profile page of the expert, and the first-degree connection of the inquirer to make the introduction. Additionally, the presentation can include the contact information of the manager of the expert.

In some instances, the user interface 202 can present a plurality of experts based on the calculated ranking values. For example, the members with the top (e.g., top three) ranking values can be presented on the display.

Figure 7:
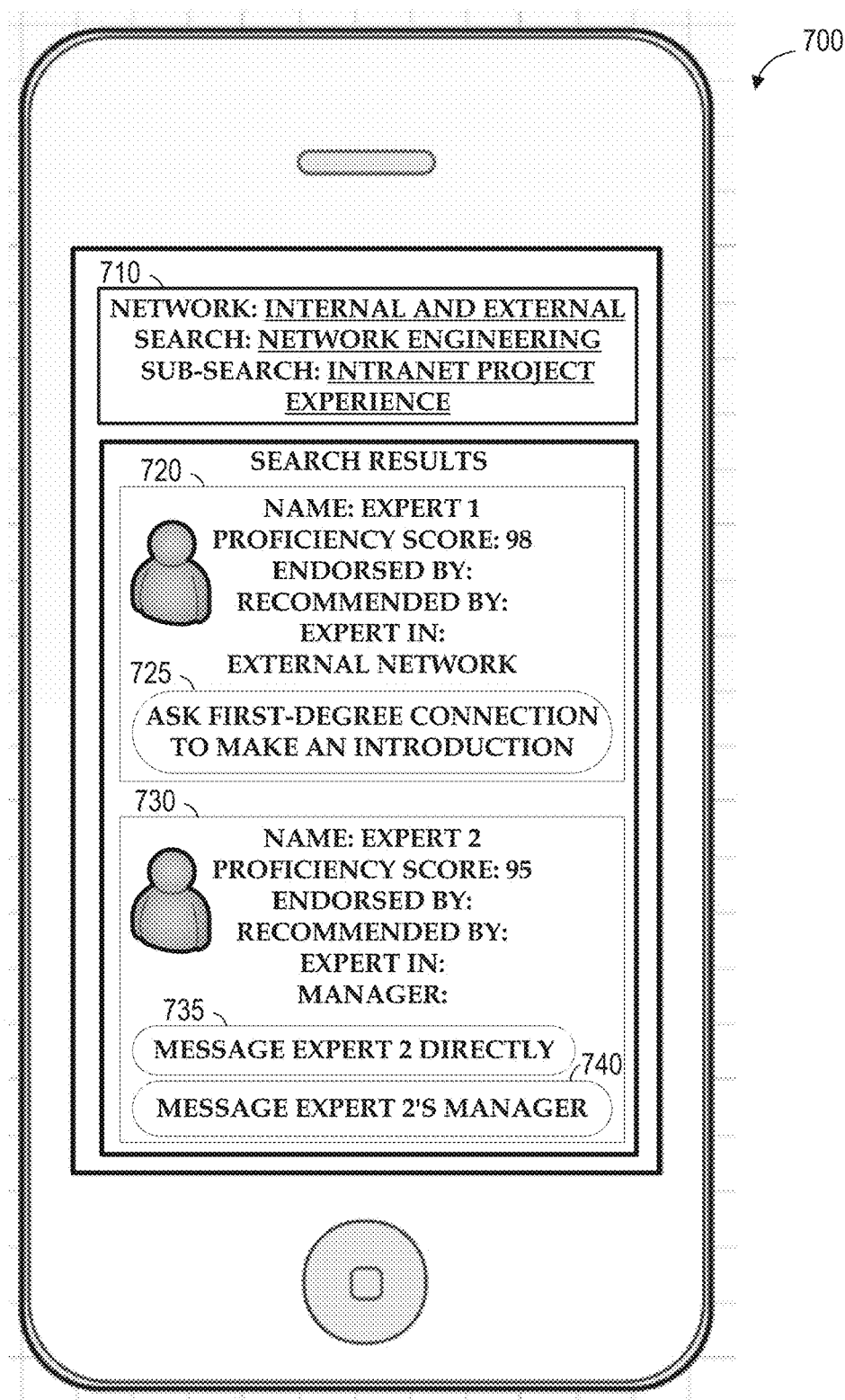
FIG. 7 is a user interface diagram illustrating an example of an expert recommendation based on the techniques described in FIGS. 5-6, according to some example embodiments.

In some instances, the method 600 can further include the optimal connection path process 208 accessing an organization chart from an employer database. The employer database can be associated with the expert. The employer database can be the employer database 120, or an employer database derived from the social graph data 214. Additionally, the optimal connection path process 208 can determine a connection path between the inquirer and the expert based on the social graph data 214 and the organization chart. Furthermore, the user interface 202 can present, on the display of the device, information associated with the determined connection path. The information associated with the determined connection path can include contact information for a manager of the expert. FIG. 7 illustrates examples of the information associated with the determined connection path.

In some instances, the optimal connection path process 208 can determine that the expert is part of an internal company network of the inquirer, and the user interface 202 can present, on the display, a user interface button for the inquirer to contact the expert. The optimal connection path process 208 can have different rules based on the expert being part of the internal network or the external network of the inquirer. The rules can be received from the expert, or set by the online social network 210.

In some instances, the expert recommendation process 206 can access, from the member activity data 217, communication frequency data of the plurality of potential experts. Additionally, the calculated ranking value can be updated based on the accessed communication frequency data.

In some instances, the profile data of members is stored in a first database, and the social graph data of the plurality of potential experts is stored in a second database.

FIG. 7 is a user interface diagram illustrating an example of an expert recommendation based on the techniques described in FIGS. 5-6, according to some embodiments.

A user interface 700 in FIG. 7 presents a first recommendation 720 for Expert 1 and a second recommendation 730 for Expert 2 based on a search request 710 from the inquirer. In some instances, the experts can be ranked based on the calculated proficiency score.

The search request 710 can include a specification of searching the inquirer's internal professional network, external professional network, or both professional networks. Additionally, the search request 710 can include a specific skill and sub-skill of the requested expert. In this example, the inquirer is searching both the internal and external professional networks, and searching for an expert in network engineering having experience in an intranet project.

The first recommendation 720 can include the name of the expert, an expert proficiency score, a list of other members that have endorsed the expert, a list of other members that have recommended the expert, and a network indication. In this example, Expert 1 is part of the inquirer's external professional network; therefore, the first recommendation 720 includes a user interface button 725 to ask a first-degree connection of the inquirer to make an introduction to Expert 1.

In some instances, the recommendation presented is based on the type of connection to the expert. For example, the second recommendation 730 is presented when the expert works at the same company. The second recommendation 730 can include similar information to the first recommendation 720. However, the second recommendation 730 is for Expert 2, who is part of the inquirer's internal professional network (e.g., works for the same company). Given that Expert 2 works at the same company, the second recommendation 730 can include the name of the manager of Expert 2, a user interface button 735 for the inquirer to contact Expert 2 directly, or another user interface button 740 for the inquirer to contact the manager of Expert 2.

According to various example embodiments, one or more of the methodologies described herein facilitate an expert recommendation for a user based on the member data 218. Additionally, based on the database structure illustrated in FIG. 2, the recommendation can be sent to a member in real-time by using the offline data processor 220 for some calculations. For example, the online social network 210 can use the offline data processor 220 for the indexing process 204, in such a way as to allow an efficient retrieval and processing of the information in order to present the recommendation in real-time.

When these effects are considered in aggregate, one or more of the methodologies described herein may obviate a need for certain human efforts or resources that otherwise would be involved in generating the recommendation. Furthermore, computing resources used by one or more machines, databases, or devices (e.g., within the network environment 100) may similarly be reduced (e.g., by pre-determining rankings of experts). Examples of such computing resources include processor cycles, network traffic, memory usage, data storage capacity, power consumption, and cooling capacity.

The indexing process 204, expert recommendation process 206, and optimal connection path process 208 allow job seekers, recruiters, and market analysts to quickly find accurate information (e.g., subject matter experts) in the online social network 210. The user interface 202 provides structure to search results, which enables fast navigation and discovery.

In order for a user to have a great search experience, correctness and performance are key. Conventional approaches either sacrifice correctness or do not perform fast enough. The methodologies described herein facilitate an expert recommendation by removing false positives using a verification process based on data available in the online social network 210. Additionally, using the offline data processor 220 to perform some of the calculations when dealing with very large data sets, such as the member data 218, the search results can be returned faster than they would be using current conventional approaches.

Furthermore, the optimal connection path process 208 can improve the user experience by connecting the inquirer to the expert using a specific path. In some instances, the specific path might not be the shortest path, but the specific path can result in a successful engagement. For example, the inquirer may be directed to the manager of the expert, in order for the manager to delegate the work to the expert.

Example Machine Architecture and Machine-Readable Medium

Figure 8:
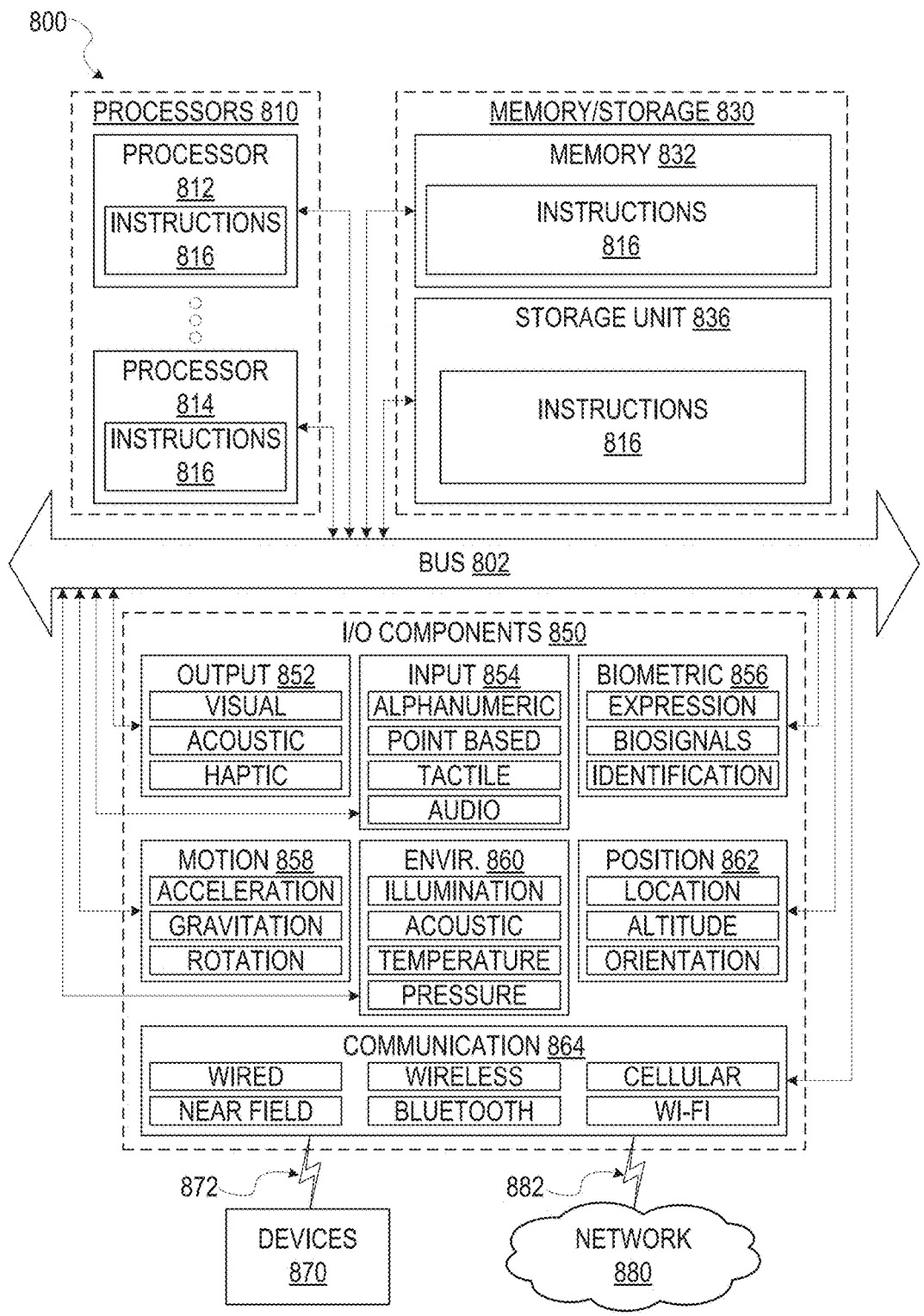
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions from a machine-readable medium (e.g., a machine-readable storage medium) and perform any one or more of the methodologies discussed herein. Specifically, FIG. 8 shows a diagrammatic representation of the machine 800 in the example form of a computer system, within which instructions 816 (e.g., software, a program, an application, an applet, an app, or other executable code) for causing the machine 800 to perform any one or more of the methodologies discussed herein may be executed. For example, the instructions may cause the machine to execute the flow diagrams of FIGS. 5 and 6. Additionally, or alternatively, the instructions may implement the indexing process 204, the expert recommendation process 206, or the optimal connection path process 208 of FIG. 2, and so forth. The instructions transform the general, non-programmed machine into a particular machine programmed to carry out the described and illustrated functions in the manner described. In alternative embodiments, the machine 800 operates as a standalone device or may be coupled (e.g., networked) to other machines. In a networked deployment, the machine 800 may operate in the capacity of a server machine or a client machine in a server-client network environment, or as a peer machine in a peer-to-peer (or distributed) network environment. The machine 800 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 816, sequentially or otherwise, that specify actions to be taken by the machine 800. Further, while only a single machine 800 is illustrated, the term "machine" shall also be taken to include a collection of machines 800 that individually or jointly execute the instructions 816 to perform any one or more of the methodologies discussed herein.

The machine 800 may include processors 810, memory/storage 830, and I/O components 850, which may be configured to communicate with each other such as via a bus 802. In an example embodiment, the processors 810 (e.g., a Central Processing Unit (CPU), a Reduced Instruction Set Computing (RISC) processor, a Complex Instruction Set Computing (CISC) processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 812 and a processor 814 that may execute the instructions 816. The term "processor" is intended to include multi-core processor that may comprise two or more independent processors (sometimes referred to as "cores") that may execute instructions contemporaneously. Although FIG. 8 shows multiple processors, the machine 800 may include a single processor with a single core, a single processor with multiple cores (e.g., a multi-core processor), multiple processors with a single core, multiple processors with multiple cores, or any combination thereof.

The memory/storage 830 may include a memory 832, such as a main memory, or other memory storage, and a storage unit 836, both accessible to the processors 810 such as via the bus 802. The storage unit 836 and memory 832 store the instructions 816 embodying any one or more of the methodologies or functions described herein. The instructions 816 may also reside, completely or partially, within the memory 832, within the storage unit 836, within at least one of the processors 810 (e.g., within the processor's cache memory), or any suitable combination thereof, during execution thereof by the machine 800. Accordingly, the memory 832, the storage unit 836, and the memory of processors 810 are examples of machine-readable media.

As used herein, "machine-readable medium" means a device able to store instructions and data temporarily or permanently and may include, but is not limited to, random-access memory (RAM), read-only memory (ROM), buffer memory, flash memory, optical media, magnetic media, cache memory, other types of storage (e.g., Erasable Programmable Read-Only Memory (EEPROM)), and/or any suitable combination thereof. The term "machine-readable medium" should be taken to include a single medium or multiple media (e.g., a centralized or distributed database, or associated caches and servers) able to store the instructions 816. The term "machine-readable medium" shall also be taken to include any medium, or combination of multiple media, that is capable of storing instructions (e.g., instructions 816) for execution by a machine (e.g., machine 800), such that the instructions, when executed by one or more processors of the machine 800 (e.g., processors 810), cause the machine 800 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" excludes signals per se.

The I/O components 850 may include a wide variety of components to receive input, provide output, produce output, transmit information, exchange information, capture measurements, and so on. The specific I/O components 850 that are included in a particular machine will depend on the type of machine. For example, portable machines such as mobile phones will likely include a touch input device or other such input mechanisms, while a headless server machine will likely not include such a touch input device. It will be appreciated that the I/O components 850 may include many other components that are not shown in FIG. 8. The I/O components 850 are grouped according to functionality merely for simplifying the following discussion and the grouping is in no way limiting. In various example embodiments, the I/O components 850 may include output components 852 and input components 854. The output components 852 may include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The input components 854 may include alphanumeric input components (e.g., a keyboard, a touch screen configured to receive alphanumeric input, a photo-optical keyboard, or other alphanumeric input components), point based input components (e.g., a mouse, a touchpad, a trackball, a joystick, a motion sensor, or other pointing instruments), tactile input components (e.g., a physical button, a touch screen that provides location and/or force of touches or touch gestures, or other tactile input components), audio input components (e.g., a microphone), and the like.

In further example embodiments, the I/O components 850 may include biometric components 856, motion components 858, environmental components 860, or position components 862, among a wide array of other components. For example, the biometric components 856 may include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 858 may include acceleration sensor components (e.g., accelerometer), gravitation sensor components, rotation sensor components (e.g., gyroscope), and so forth. The environmental components 860 may include, for example, illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detect concentrations of hazardous gases for safety or to measure pollutants in the atmosphere), or other components that may provide indications, measurements, or signals corresponding to a surrounding physical environment. The position components 862 may include location sensor components (e.g., a Global Position System (GPS) receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 850 may include communication components 864 operable to couple the machine 800 to a network 880 or devices 870 via a coupling 882 and a coupling 872 respectively. For example, the communication components 864 may include a network interface component or other suitable device to interface with the network 880. In further examples, the communication components 864 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 870 may be another machine or any of a wide variety of peripheral devices (e.g., a peripheral device coupled via a Universal Serial Bus (USB)).

Moreover, the communication components 864 may detect identifiers or include components operable to detect identifiers. For example, the communication components 864 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 864, such as location via Internet Protocol (IP) geolocation, location via Wi-Fi® signal triangulation, location via detecting an NFC beacon signal that may indicate a particular location, and so forth.

Transmission Medium

In various example embodiments, one or more portions of the network 880 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, the network 880 or a portion of the network 880 may include a wireless or cellular network and the coupling 882 may be a Code Division Multiple Access (CDMA) connection, a Global System for Mobile communications (GSM) connection, or another type of cellular or wireless coupling. In this example, the coupling 882 may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

The instructions 816 may be transmitted or received over the network 880 using a transmission medium via a network interface device (e.g., a network interface component included in the communication components 864) and utilizing any one of a number of well-known transfer protocols (e.g., hypertext transfer protocol (HTTP)). Similarly, the instructions 816 may be transmitted or received using a transmission medium via the coupling 872 (e.g., a peer-to-peer coupling) to the devices 870. The term "transmission medium" shall be taken to include any intangible medium that is capable of storing, encoding, or carrying the instructions 816 for execution by the machine 800, and includes digital or analog communications signals or other intangible media to facilitate communication of such software.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Certain embodiments are described herein as including logic or a number of components, modules, or mechanisms. Modules may constitute software modules (e.g., code stored or otherwise embodied on a machine-readable medium or in a transmission medium), hardware modules, or any suitable combination thereof. A "hardware module" is a tangible (e.g., non-transitory) unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, and such a tangible entity may be physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software (e.g., a software module) may accordingly configure one or more processors, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. As used herein, "processor-implemented module" refers to a hardware module in which the hardware includes one or more processors. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application programming interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
    performing operations for reducing computing resources used by an online social network by generating a user interface to structure search results corresponding to a plurality of potential experts in a specific skill and to limit presentation of endorsement data of an expert presented in the search results to an inquirer that is within a threshold degree of connection from the expert the operations comprising:
        receiving, from a device of the inquirer, a search request for the expert in the specific skill;
        accessing, from a database in the online social network, profile data of members in the online social network, the profile data including the endorsement data;

determining the plurality of potential experts from the members in the online social network based on the profile data;

accessing social graph data of the plurality of potential experts, the social graph data including degrees of connections between the inquirer and the plurality of potential experts;

calculating, using a processor, a ranking value for each member of the plurality of potential experts based on the accessed profile data and the accessed social graph data;

verifying the expert from the plurality of potential experts based on the calculated ranking value for each member of the plurality of potential experts, the calculated ranking value of the expert being higher than a predetermined threshold; and including the profile data for the verified expert in the search results for presentation on a display of the device, based on a determination that a degree of connection between the verified expert and the inquirer is within the threshold degree of connection.

2. The method of claim 1, further comprising:

accessing an organization chart from an employer database;

determining a connection path between the inquirer and the expert based on the social graph data and the organization chart; and presenting, on the display of the device, information associated with the determined connection path.

3. The method of claim 2, wherein the information associated with the determined connection path includes contact information for a manager of the expert.

4. The method of claim 1, wherein the search request includes a sub-skill, the method further comprising:

determining a subset of experts from the plurality of potential experts, each member in the subset of experts having member profile data that includes the sub-skill; and increasing the calculated ranking value for each member of the subset of experts.

5. The method of claim 4, wherein the sub-skill is a previously completed project.

6. The method of claim 1, further comprising:

determining that the expert is part of an internal company network of the inquirer; and presenting, on the display, a user interface button for the inquirer to contact the expert.

7. The method of claim 1, further comprising:

accessing, from a member activity database, communication frequency data of the plurality of potential experts; and updating the calculated ranking value based on the accessed communication frequency data.

8. The method of claim 1, wherein the member profile data includes a recommendation, and the verifying of the expert is based on the expert having a recommendation associated with the specific skill.

9. The method of claim 1, wherein the member profile data includes a location for each member in the plurality of potential experts, and the verifying of the expert is based on a distance from the inquirer to the location of the expert being below a predetermined threshold.

10. The method of claim 1, wherein the member profile data includes an availability indicator for each member in the plurality of potential experts, and the verifying of the expert is based on the availability indicator for the expert indicating that the expert is available.

11. The method of claim 1, wherein the member profile data includes years of experience, and the verifying of the expert is based on the years of experience of the expert being above a predetermined threshold.

12. The method of claim 1, wherein the member profile data includes a certification, and the verifying of the expert is based on the expert having the certification.

13. The method of claim 1, wherein the profile data of members is stored in a first database, and the social graph data of the plurality of potential experts is stored in a second database.

14. A non-transitory machine-readable storage medium comprising instructions that, when executed by one or more processors of a machine, cause the machine to perform operations for reducing computing resources used by an online social network by generating a user interface to structure search results corresponding to a plurality of potential experts in a specific skill and to limit presentation of endorsement data of an expert presented in the search results to an inquirer that is within a threshold degree of connection from the expert, the operations comprising:

receiving, from a device of the inquirer, a search request for the expert in the specific skill;

accessing, from a database in the online social network, profile data of members in the online social network, the profile data including the endorsement data;

determining the plurality of potential experts from the members in the online social network based on the profile data;

accessing social graph data of the plurality of potential experts, the social graph data including degrees of connections between the inquirer and the plurality of potential experts;

calculating a ranking value for each member of the plurality of potential experts based on the accessed profile data and the accessed social graph data;

verifying the expert from the plurality of potential experts based on the calculated ranking value for each member of the plurality of potential experts, the calculated ranking value of the expert being higher than a predetermined threshold; and including the profile data for the verified expert in the search results for presentation on a display of the device based on a determination that a degree of connection between the verified expert and the inquirer is within the threshold degree of connection.

15. The storage medium of claim 14, further comprising instructions that cause the machine to perform operations comprising:

accessing an organization chart from an employer database;

determining a connection path between the inquirer and the expert based on the social graph data and the organization chart; and presenting, on the display of the device, information associated with the determined connection path.

16. The storage medium of claim 14, further comprising instructions that cause the machine to perform operations comprising:

determining a subset of experts from the plurality of potential experts, each member in the subset of experts having member profile data that includes the sub-skill; and increasing the calculated ranking value for each member of the subset of experts.

17. The storage medium of claim 14, further comprising instructions that cause the machine to perform operations comprising:
  determining that the expert is part of an internal company network of the inquirer; and
  presenting, on the display, a user interface button for the inquirer to contact the expert.

18. The storage medium of claim 14, further comprising instructions that cause the machine to perform operations comprising:
  accessing, from a member activity database, communication frequency data of the plurality of potential experts; and
  updating the calculated ranking value based on the accessed communication frequency data.

19. An online social network comprising:
  one or more databases having profile data of members in the online social network, the profile data including endorsement data, and social graph data of the members, the social graph data including degrees of connection between the members;
  one or more processors configured to perform operations for reducing computing resources used by an online social network by generating a user interface to structure search results corresponding to a plurality of potential experts in a specific skill and to limit presentation of endorsement data of an expert presented in the search results to an inquirer that is within a threshold degree of connection from the expert, the operations comprising:
  receiving, from a device of the inquirer, a search request for the expert in the specific skill;
  determine, using the profile data, the plurality of potential experts from the members in the online social network based on the profile data;
  calculate a ranking value for each member of the plurality of potential experts based on the profile data and the social graph data; and
  verify the expert from the plurality of potential experts based on the calculated ranking value for each member of the plurality of potential experts, the calculated ranking value of the expert being higher than a predetermined threshold; and
  a user interface to include the profile data for the verified expert in the search results for presentation on a display of the device based on a determination that a degree of connection between the verified expert and the inquirer is within the threshold degree of connection.

* * * * *

UNITED STATES PATENT AND TRADEMARK OFFICE
CERTIFICATE OF CORRECTION

PATENT NO. : 10,133,993 B2
APPLICATION NO. : 14/957486
DATED : November 20, 2018
INVENTOR(S) : Rathod et al.

Page 1 of 1

It is certified that error appears in the above-identified patent and that said Letters Patent is hereby corrected as shown below:

In the Claims

In Column 22, Line 61, in Claim 1, after "expert", insert --,--

In Column 23, Line 19, in Claim 1, delete "device," and insert --device-- therefor Signed and Sealed this
Twenty-eighth Day of April, 2020

Andrei Iancu
*Director of the United States Patent and Trademark Office*